United States Patent [19]

Kawano

[11] Patent Number: 4,903,159

[45] Date of Patent: Feb. 20, 1990

[54] TAPE CASSETTE

[75] Inventor: Masatoshi Kawano, Tokyo, Japan

[73] Assignee: Sony Corporation, Tokyo, Japan

[21] Appl. No.: 256,409

[22] Filed: Oct. 12, 1988

[30] Foreign Application Priority Data

Oct. 16, 1987 [JP] Japan .................................. 62-261098

[51] Int. Cl.$^4$ ............................................. G11B 23/02
[52] U.S. Cl. .................................................... 360/132
[58] Field of Search .................................. 360/60, 132

[56] References Cited

U.S. PATENT DOCUMENTS

| 4,215,377 | 7/1980 | Norris | 360/73.07 |
| 4,743,984 | 5/1988 | Ryan | 360/60 |

Primary Examiner—Vincent P. Canney
Attorney, Agent, or Firm—Lewis H. Eslinger; Jay H. Maioli; Donald S. Dowden

[57] ABSTRACT

A new video tape cassette includes a cassette housing having an opening formed therein at a position corresponding to the position of a detecting aperture of a conventional video tape cassette. The detecting aperture is provided to prevent improper recording. The new tape cassette is intended for recording only in a new recording format, and the conventional tape cassette is intended for recording only in a conventional recording format. The opening prevents a recording when the new tape cassette is inserted by mistake into a conventional video tape recorder. A second detector for preventing improper recording and a detecting portion are provided to ensure that it is impossible to record in the wrong format, regardless of whether a new or conventional-type tape cassette is inserted into a new or conventional-type video tape recorder. However, the new video tape recorder can be made "upwardly compatible," meaning that it can reproduce not only the novel magnetic tape having the novel recording format but also the conventional magnetic tape having the conventional recording format.

7 Claims, 4 Drawing Sheets

TAPE CASSETTE

BACKGROUND OF THE INVENTION

1. Field of the Invention

The present invention relates generally to tape cassettes and more particularly to a tape cassette having wound therein a novel magnetic tape that has at least one characteristic such as a recording format that is different from a corresponding characteristic of a conventional magnetic tape.

2. Description of the Prior Art

Tape cassettes have recently been improved as disclosed in U.S. applications Ser. No. 07/081,983 of Tadao Igarashi et al., filed Aug. 5, 1987, and Ser. No. 07/125,562 of Haruyuki Karibe et al., filed Nov. 25, 1987, both assigned to the assignee of the present invention. The disclosures of those applications are incorporated herein by reference.

It is desirable that the recording and reproducing characteristics of home VTRs (video tape recorders) be further improved and especially that the resolution and other aspects of picture quality be improved as compared with those of existing or conventional video tape recorders. However, in order to realize recording and reproduction with high resolution and excellent picture quality, a major revision of the conventional recording format is necessary, certain characteristics of a conventional magnetic tape as a recording medium have to be changed, and so on.

When a recording is made on such a novel magnetic tape by conventional apparatus, satisfactory recording and reproduction cannot be achieved, because there is an incompatibility between the recording and reproducing characteristics of the tape and the requirements of the apparatus. In addition, it is undesirable that there exist different recording formats in a single tape, and it is similarly undesirable that the recording be carried out on the conventional tape in accordance with the novel recording format.

The video tape recorder that carries out the recording with the novel recording format should have so-called upward compatibility, meaning that it can reproduce not only the novel magnetic tape having the novel recording format but also the conventional magnetic tape with the conventional recording format. To this end, a tape cassette with a novel magnetic tape loaded therein has a cassette housing formed substantially the same, as viewed from the outside, as the housing of the tape cassette with the conventional magnetic tape. Thus, both the novel and the conventional tape cassettes can be freely loaded into either the novel or the conventional recording/reproducing apparatus. There is then a risk that the tape cassette with the novel magnetic tape will be inadvertently loaded into the conventional apparatus for recording or that the tape cassette with the conventional magnetic tape will be inadvertently loaded into the apparatus for recording in accordance with the novel recording format. If either of those events occurs, it becomes impossible to achieve reproduction from the erroneously-recorded magnetic tape.

FIG. 1 shows the construction of a conventional tape cassette. As that figure shows, a cassette housing 51 of the conventional tape cassette has a detecting aperture 52 for preventing improper recording formed in its lower surface at a predetermined position. When a frangible tab 53 that protrudes into the above-mentioned aperture 52 is removed, mis-recording can be avoided, since conventional recording/reproducing apparatus is provided with means for detecting the absence of the tab 53 and means responsive to such detection for inhibiting recording.

OBJECTS AND SUMMARY OF THE INVENTION

An object of the present invention is to provide an improved tape cassette. In particular, an object of the invention is to provide a tape cassette that can prevent recording on a conventional tape using a novel recording format that is inappropriate to such tape.

Another object of the invention is to provide a tape cassette that can prevent a tape from becoming unreproducible because of an improper recording procedure.

Another object of the invention is to provide a tape cassette that can prevent different recording formats from being recorded on a single tape.

Another object of the invention is to provide apparatus for cooperating with a tape cassette constructed in accordance with the invention.

According to an aspect of the present invention, there is provided a novel tape cassette for accommodating a tape that has a characteristic different from that of a conventional tape and that can be loaded into recording and/or reproducing apparatus designed to accept either the novel tape cassette or a conventional tape cassette formed with a housing and an aperture in the housing for preventing improper recording, the apparatus being designed with upwarded compatibility so that it can record and/or reproduce according to a conventional format or a format different from a conventional format depending on whether the conventional tape cassette or the novel tape cassette is loaded into the apparatus, the novel tape cassette comprising: a cassette housing having a size and shape that are respectively substantially the same as the size and shape of the housing of the conventional tape cassette; first detecting means provided on the cassette housing of the novel tape cassette at a position corresponding to the aperture of the conventional tape cassette housing; second detecting means provided on the cassette housing of the novel tape cassette at a position spaced apart from the first detecting means; and a detecting portion provided on the cassette housing of the novel tape cassette for indicating that the tape cassette having a different characteristic is wound within the cassette housing of the novel tape cassette.

The preceding and other objects, features and advantages of the present invention will become apparent from the following detailed description of the preferred embodiment thereof, to be taken in conjunction with the accompanying drawings, throughout which like reference numerals identify like elements and parts.

DESCRIPTION OF THE PREFERRED EMBODIMENT

An embodiment of a tape cassette according to the present invention is described in detail below with reference to the drawings.

Figure 2:
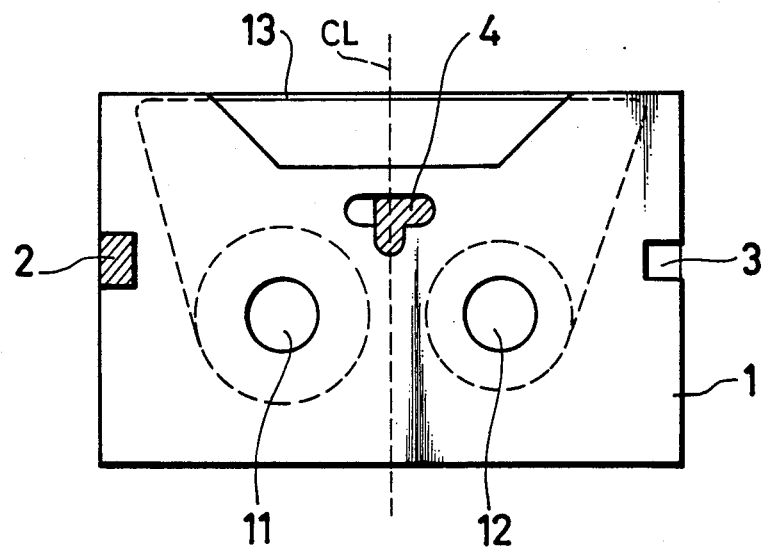
FIG. 2 is a plan view of a preferred embodiment of a tape cassette constructed in accordance with the present invention.

The plan view of FIG. 2 shows a preferred embodiment of a tape cassette constructed in accordance with the present invention. As FIG. 2 shows, the novel tape cassette of the present invention is provided with a housing 1. The cassette housing 1 has reels 11 and 12 incorporated therein, and a magnetic tape 13 with characteristics different from those of a conventional magnetic tape is wound on the reels 11 and 12.

Figure 1:
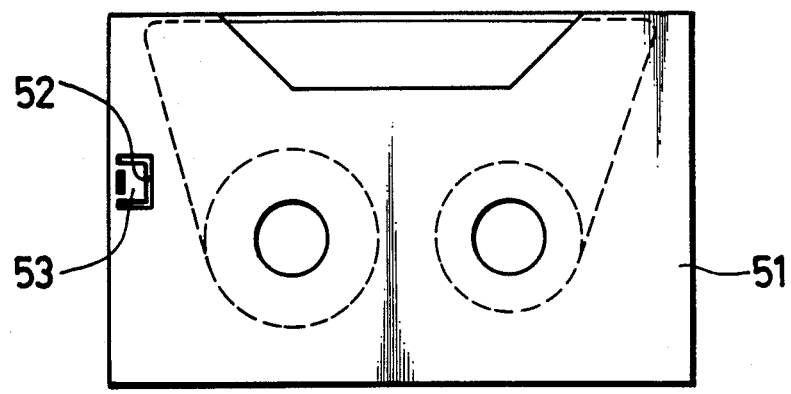
FIG. 1 is a plan view showing the construction of a conventional tape cassette.

As indicated by diagonal shading, the cassette housing 1 has a permanent opening 2 (that is, no tab is provided originally corresponding to the tab 53 of FIG. 1) formed in its lower surface at a position corresponding to the detecting aperture 52 formed in the above-mentioned cassette housing 51 of the conventional tape cassette shown in FIG. 1. As a result, if the novel tape cassette of FIG. 2 is inadvertently inserted into a conventional recording/reproducing apparatus, recording thereon is inhibited.

Further, the cassette housing 1 has a left-and-right direction extending parallel to the displacement of the reels 11 and 12 from each other and a longitudinal centerline CL normal to the left-and-right direction and has novel detecting means 3 provided on its lower surface at a position different from that of the opening 2, e.g., at a position selected with respect to the longitudinal centerline CL of the cassette housing 1 so that it is symmetrical in the left-and-right direction with the position of the opening 2. In other words, the detecting means 3 is at a position on the right side of the cassette housing 1 corresponding to the position of the opening 2 on the left side of the cassette housing 1. The opening 3 is not a permanent one and has a slidable tab not separately illustrated that can be slid in one direction to enable recording or in the opposite direction to inhibit recording.

In addition, the cassette housing 1 has a detecting portion 4 formed in a central portion of its lower surface, for example on the centerline CL slightly towards the front of the cassette housing 1. This detecting portion 4 is used to indicate that the novel magnetic tape 13 is wound between the reels 11 and 12. The shaded area of the detecting portion 4 represents an opening which is adjusted in accordance with the kind of tape (i.e., whether or not the tape is intended for the novel apparatus) and the length of the tape, while the unshaded area represents a tab area which has not been opened. In other words, the pattern of the shaded area may be changed in accordance with the kind and the length of the tape.

Accordingly, a novel apparatus 60 (FIG. 6) into which such a novel tape cassette is inserted has detecting devices 62, 64, 66 respectively provided at positions corresponding to the opening 2, the detecting means 3 and the detecting portion 4 of the cassette housing 1. This novel apparatus functions upon starting of the recording as shown in the flow chart forming FIG. 3.

Figure 3:
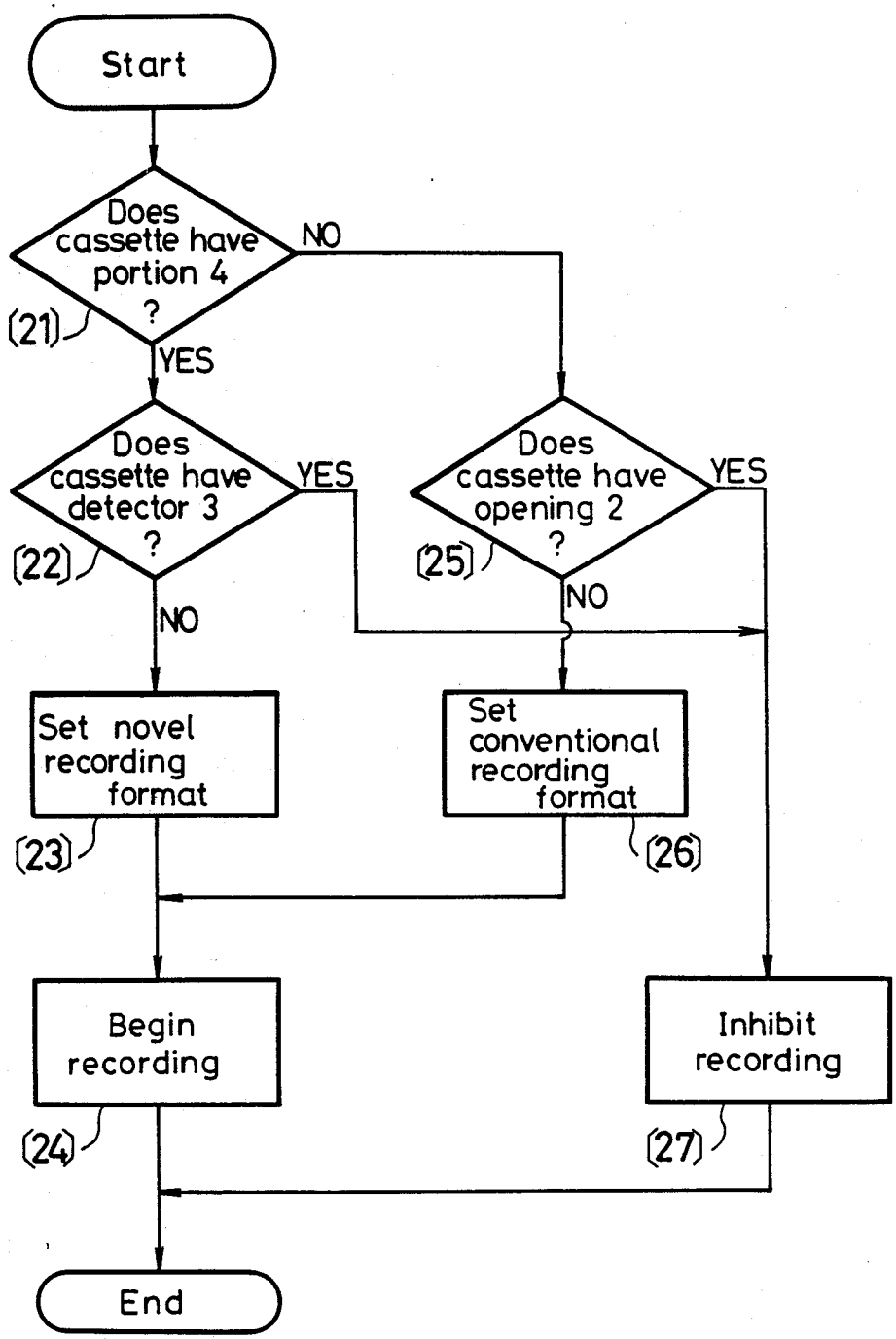
FIG. 3 is a flow chart to which reference is made in explaining the recording-start operation of a novel recording/reproducing apparatus designed to cooperate with the tape cassette of FIG. 2.
Figure 6:
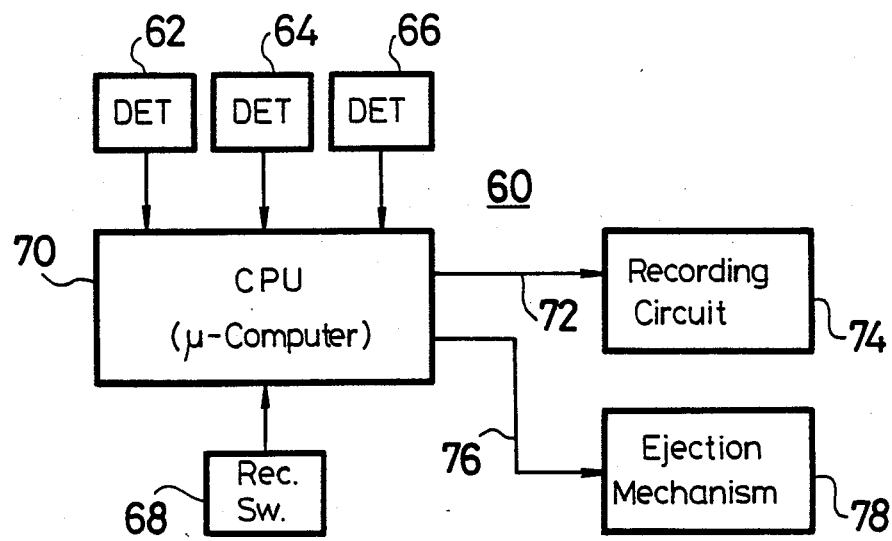
FIG. 6 is a schematic representation of apparatus for cooperating with a tape cassette constructed in accordance with the present invention.

As FIG. 3 shows, when a recording button or switch 68 of FIG. 6, which may be a timer-activated recording switch, of the novel apparatus 60 is operated to begin the recording operation, it is determined at decision step [21] of a program for guiding the microcomputer central processing unit 70 whether or not the tape cassette has the detecting portion 4. This determination is made in accordance with a signal from the detector 66 of FIG. 6. If the tape cassette has the detecting portion 4, as represented by a YES at step [21], it is determined that the tape cassette is the novel one of the present invention. If not, as represented by a NO at step [21], it is determined that the tape cassette is of conventional construction. When the tape cassette is found to have the detecting portion 4, the routine goes to the next decision step [22]. It is determined at decision step [22] whether or not the tape cassette has the detecting means 3. This determination is made in accordance with a signal from the detector 64 of FIG. 6. If the tape cassette has the detecting means 3, as represented by a YES at step [22] (i.e., the detecting means 3 is in the open position), the recording is inhibited, as indicated at step [27] described below. If on the other hand the tape cassette has no detecting means 3, as represented by a NO at step [22] (i.e., the detecting means 3 is in the closed position), the recording is enabled. In particular, if the tape cassette is found at step [22] to have no detecting means 3, the routine goes to step [23]. At step [23], the novel recording format of the present invention is set, a signal representative of the novel format is transmitted on a line 72 to a recording circuit 74 (FIG. 6), and the recording mode (including, if applicable, the setting of the timer-activated recording) begins at step [24]. That concludes the recording-start operation.

If the tape cassette is found to have no detecting portion 4, as represented by a NO at decision step [21], the routine goes to the next decision step [25], where it is determined whether or not the tape cassette has the opening 2. If the tape cassette has the opening 2, as represented by a YES at decision step [25], it is known that the tape cassette is of conventional construction and that its tab 53 shown in FIG. 1 has been removed to inhibit recording. If the tape cassette is found to have no opening 2, as represented by a NO at decision step [25], the recording is enabled. Specifically, if the tape cassette is found to have no opening 2, the routine goes to step [26], at which the conventional recording format is set, a signal representative of the conventional format is transmitted on the line 72 to the recording circuit 74, and then the recording mode begins at step [24].

Thus, if the tape cassette has either the detecting means 3 or the opening 2, as represented by a YES at decision step [22] or [25], the routine goes to step [27], at which the recording is inhibited, an ejection signal is generated by the CPU 70 and transmitted on a line 76 to an ejection mechanism 78 (FIG. 6) and the tape cassette is ejected by the ejection mechanism 78, thus ending the recording-start operation.

Thus, when the novel tape cassette or the conventional tape cassette is loaded into the novel recording and/or reproducing apparatus, the recording format is set in the apparatus in accordance with whichever of the tape cassettes has been inserted, and then the recording begins. In addition, the operation for preventing improper recording is performed with respect to the inserted tape cassette, so that it is not possible to record using the wrong format.

Figure 4:
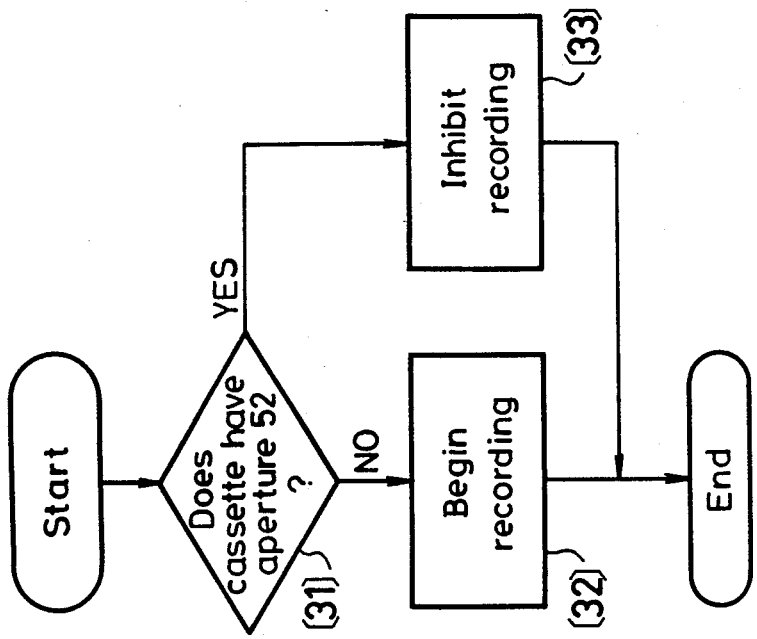
FIG. 4 is a flow chart to which reference is made in explaining the recording-start operation of a conventional recording/reproducing apparatus.

When a tape cassette, which may be of novel or conventional construction, is loaded into conventional recording and/or reproducing apparatus, the conventional apparatus performs the conventional operation shown in the flow chart of FIG. 4.

As FIG. 4 showns, when the recording operation is started by depressing a recording button (not shown), it is determined at decision step [31] whether or not the tape cassette has the detecting aperture 52. If the tape cassette has the detecting aperture 52, as represented by a YES at step [31], it is judged that the tape cassette is of conventional construction and that its tab 53 has been removed to inhibit the recording. Recording is therefore inhibited. If the tape cassette has no detecting aperture 52 (meaning that it is not the novel tape cassette of the present invention), the recording is enabled. In particular, if the tape cassette has no detecting aperture 52, as represented by a NO at decision step [31], the recording mode begins at step [32], and then the recording-starting operation is ended. If the tape cassette has the detecting aperture 52, as represented by a YES at decision step [31], the recording is inhibited at the next step [33], and, for example, the tape cassette is ejected, thus ending the recording-start operation.

When the above-mentioned novel tape cassette is loaded into the conventional apparatus, it is determined at decision step [31] that the inserted tape cassette has the opening 2. This is tantamount to a determination that the tape cassette has the detecting aperture 52. Therefore, the operations of inhibiting the recording, ejecting the tape cassette, etc., are performed.

When the novel tape cassette containing a tape having different characteristics is loaded into conventional recording and/or reproducing apparatus, the mechanism of the conventional apparatus for preventing improper recording is actuated because of the provision of the opening 2. When a conventional tape cassette is loaded into the novel recording and/or reproducing apparatus described above, the conventional tape cassette is identified by the absence of the detecting portion 4, and recording is inhibited, so that the tape is prevented from becoming unreproducible. Moreover, recording with different formats on a single tape is prevented.

In addition, in the reproduction mode, the above-mentioned novel recording and/or reproducing apparatus sets the novel reproducing format by determining whether or not the tape cassette has the detecting portion 4.

The novel recording and/or reproducing apparatus can be varied in such a manner that it does not incorporate the conventional recording format and will not record on a conventional tape. In that case, the recording-start operation is performed as shown in the flow chart of FIG. 5.

Figure 5:
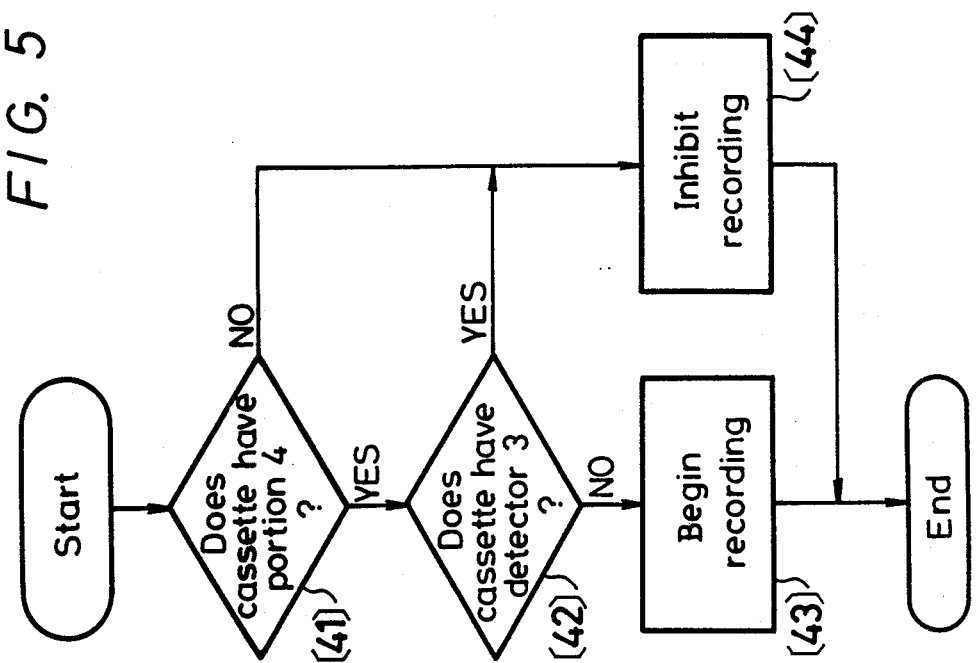
FIG. 5 is another flow chart to which reference is made in explaining the recording-start operation of another form of the novel recording/reproducing apparatus.

As FIG. 5 shows, when the recording switch 68 of FIG. 6 is operated to start the recording operation, it is determined at decision step [41] whether or not the tape cassette has the detecting portion 4. If the tape cassette has the detecting portion 4, as represented by a YES at step [41], the routine goes to the next decision step [42]. It is then determined at step [42] whether or not the tape cassette has the detecting means 3. If the tape cassette is found to have no detecting means 3 (i.e, the detecting means 3 is in the closed position), as represented by a NO at step [42], the recording mode begins at step [43], and then the recording-start operation is ended.

If the tape cassette has no detecting portion 4, as represented by a NO at step [41], or if the tape cassette has the detecting means 3 (i.e., the detecting means 3 is in the open position), as represented by a YES at step [42], the routine goes to step [44], at which the tape cassette is, for example, ejected and the recording start operation is ended.

Inadvertent recording with the novel recording format on a conventional tape is thus reliably prevented in accordance with the invention.

As the disclosure of the present invention set out above makes clear, when the novel tape cassette with the tape of different characteristics is loaded into a conventional recording and/or reproducing apparatus, the mechanism of the conventional recording and/or reproducing apparatus for preventing improper recording is actuated by the opening 2 provided in the novel tape cassette. On the other hand, when a conventional tape cassette is loaded into the novel recording and/or reproducing apparatus, the conventional tape cassette is identified by the absence of the detecting portion 4. Thus, recording with different characteristics is inhibited to prevent the tape from becoming unreproducible. Moreover, the recording with different formats on a single tape is prevented.

It should be understood that the disclosure of a single preferred embodiment of the invention set out above is presented by way of example. Many modifications and variations of the disclosed embodiment of the invention can be effected by one with ordinary skill in the art without departing from the spirit and scope of the novel concepts of the invention. The scope of the invention is therefore determined only by the appended claims.

What is claimed is:

1. A novel tape cassette for accommodating a tape that has a characteristic different from that of a conventional tape and that can be loaded into recording and/or reproducing apparatus designed to accept either said novel tape cassette or a conventional tape cassette formed with a housing and an aperture in said housing for preventing improper recording, said apparatus being designed with upward compatibility so that it can record and/or reproduce according to a conventional format or a format different from a conventional format depending on whether said conventional tape cassette or said novel tape cassette is loaded into said apparatus, said novel tape cassette comprising:

a cassette housing having a size and shape that are respectively substantially the same as the size and shape of the housing of said conventional tape cassette;

first detecting means provided adjacent to one edge of said cassette housing of said novel tape cassette at a position corresponding to the aperture of said conventional tape cassette housing;

second detecting means provided adjacent to an opposite edge of said cassette housing of said novel tape cassette; and a detecting portion provided on said cassette housing of said novel tape cassette for indicating that tape having a different characteristic is wound within said cassette housing of said novel tape cassette.

2. A novel tape cassette according to claim 1 wherein said first detecting means is formed as an aperture substantially identical to the aperture in said housing of said conventional tape cassette.

3. A novel tape cassette according to claim 1 wherein said cassette housing of said novel tape cassette has a left-and-right direction and a longitudinal centerline normal to said left-and-right direction and said position of said second detecting means is selected with respect to said centerline so as to be symmetrical in the left-and-right direction with the position of said first detecting means.

4. A novel cassette according to claim 1 wherein said cassette housing of said novel tape cassette is formed with a lower surface and said detecting portion is formed on said lower surface at a central portion thereof.

5. Apparatus for cooperating with a novel tape cassette according to claim 1, said apparatus comprising first, second and third sensing means respectively responsive to said first detecting means, said second detecting means, and said detecting portion.

6. Apparatus according to claim 5 further comprising a microcomputer connected to receive signals from each of said sensing means, a recording circuit connected to said microcomputer, and a recording switch connected to said microcomputer, said microcomputer in response to operation of said recording switch controlling said recording circuit to begin recording in said conventional format or said format different from said conventional format, depending upon said signals received from said sensing means.

7. Apparatus according to claim 6 further comprising an ejection mechanism connected to said microcomputer for performing an ejection operation if said signals received from said sensing means are incompatible with a recording operation in response to said operation of said recording switch.

* * * * *